(12) United States Patent
Shirai et al.

(10) Patent No.: US 12,436,149 B2
(45) Date of Patent: Oct. 7, 2025

(54) INFLAMMATORY BOWEL DISEASE DIAGNOSIS METHOD, DIAGNOSIS PROBE AND DIAGNOSIS KIT

(71) Applicant: TOHOKU UNIVERSITY, Miyagi (JP)

(72) Inventors: Tsuyoshi Shirai, Miyagi (JP); Hiroshi Fujii, Miyagi (JP); Tomonori Ishii, Miyagi (JP); Hideo Harigae, Miyagi (JP); Yoichi Kakuta, Miyagi (JP); Atsushi Masamune, Miyagi (JP); Tomoyuki Mutoh, Miyagi (JP)

(73) Assignee: TOHOKU UNIVERSITY, Miyagi (JP)

( * ) Notice: Subject to any disclaimer, the term of this patent is extended or adjusted under 35 U.S.C. 154(b) by 878 days.

(21) Appl. No.: 17/631,117

(22) PCT Filed: Aug. 25, 2020

(86) PCT No.: PCT/JP2020/031986
§ 371 (c)(1),
(2) Date: Jan. 28, 2022

(87) PCT Pub. No.: WO2021/039771
PCT Pub. Date: Mar. 4, 2021

(65) Prior Publication Data
US 2022/0276243 A1 Sep. 1, 2022

(30) Foreign Application Priority Data
Aug. 29, 2019 (JP) .................................. 2019-156558

(51) Int. Cl.
*G01N 33/53* (2006.01)
*G01N 33/564* (2006.01)

(52) U.S. Cl.
CPC ..... *G01N 33/564* (2013.01); *G01N 2800/065* (2013.01); *G01N 2800/50* (2013.01); *G01N 2800/52* (2013.01); *G01N 2800/54* (2013.01)

(58) Field of Classification Search
None
See application file for complete search history.

(56) References Cited

U.S. PATENT DOCUMENTS

| | | | |
|---|---|---|---|
| 2004/0077020 A1 | 4/2004 | Mannick et al. | |
| 2007/0141625 A1* | 6/2007 | Santos | G01N 33/564 435/7.1 |

FOREIGN PATENT DOCUMENTS

| | | |
|---|---|---|
| JP | 2007-506100 | 3/2007 |
| JP | 2007-529205 | 10/2007 |
| JP | 2018-25554 | 2/2018 |
| JP | 2019-168403 | 10/2019 |
| WO | 2005/029091 | 3/2005 |
| WO | 2005/087789 | 9/2005 |
| WO | 2017/223117 | 12/2017 |

OTHER PUBLICATIONS

Van Der Vekiens et al., Human and equine cardiovascular endocrinology: beware to compare, Cardiovascular Endocrinology 2013, vol. 2, No. 4, pp. 67-76 (Year: 2013).*
Torzewski et al., Animal Models of C-Reactive Protein, Hindawl Publishing Corporation, Mediators of Inflammation, vol. 2014, Article ID 683598, 2014, pp. 1-7. (Year: 2014).*
Montes et al., Autoantibodies against the endothelial receptor of protein C are associated with acute myocardial infarction in young women, Journal of Thombosis and Haemostasis, 3, 2005, pp. 1454-1458). (Year: 2005).*
Hurtado et al., Autoantibodies against EPCR are found in antiphospholipid syndrome and are a risk factor for fetal death , Blood, Sep. 2004, vol. 104, No. 5, pp. 1369-1374). (Year: 2004).*
International Search Report issued Oct. 27, 2020 in International (PCT) Application No. PCT/JP2020/031986.
Zhou, Guangxi et al., "Asca, anca, alca and Many More: Are They Useful in the Diagnosis of Inflammatory Bowel Disease", Digestive Diseases, 2016, vol. 34, pp. 90-97.
Scaldaferri, Franco et al., "Crucial role of the protein C pathway in governing microvascular inflammation in inflammatory bowel disease", The Journal of Clinical Investigation, 2007, vol. 117, No. 7, pp. 1951-1960.
Horita, Tetsuya et al., "An investigation into the influences of EPCR gene polymorphisms, anti-EPCR antibodies, and disease activity on soluble endothelial protein C receptor (sEPCR) concentrations in SLE patients", Programs and abstracts of Annual General Assembly and Scientific Meeting of Japan College of Rheumatology and International Rheumatology Symposium, Mar. 2006, vol. 50th-15th, p. 139 (with English translation).
Mutoh, Tomoyuki et al., "Identification of two major autoantigens negatively regulating endothelial activation of Takayasu arteritis", Nature Communications, Mar. 2020, vol. 11, No. 1, Article No. 1253, 13 pages.
Shirai, Tsuyoshi et al., "Identification of Endothelial Protein C Receptor and Scavenger Receptor Class B Type 1 as Major Autoantigens in Takayasu Arteritis", Annals of the Rheumatic Diseases: The EULAR Journal, vol. 78, Supplemental 2, pp. 437-438, Abstract THU0317; abstract publicly presented Jun. 13, 2019; abstract available on line from May 27, 2019 at the following website: https://ard.bmj.com/content/78/Suppl_2/437.2#block-system-main.

* cited by examiner

*Primary Examiner* — Gary Counts
(74) *Attorney, Agent, or Firm* — Wenderoth, Lind & Ponack, L.L.P.

(57) ABSTRACT

Provided are a novel determination method, diagnostic probe, and diagnostic kit for inflammatory bowel disease. A method for determining inflammatory bowel disease includes measuring an anti-endothelial cell protein C receptor antibody (anti-EPCR antibody) in a sample collected from a subject.

7 Claims, 1 Drawing Sheet
Specification includes a Sequence Listing.

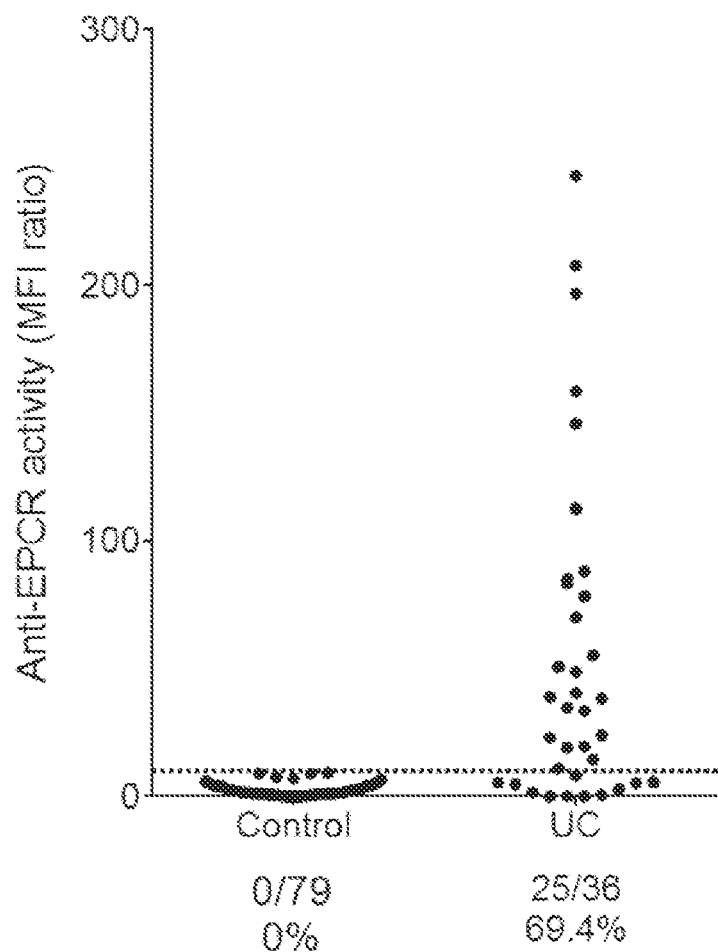

SEQUENCE LISTING

```
<160> NUMBER OF SEQ ID NOS: 2

<210> SEQ ID NO 1
<211> LENGTH: 238
<212> TYPE: PRT
<213> ORGANISM: Homo sapiens

<400> SEQUENCE: 1

Met Leu Thr Thr Leu Leu Pro Ile Leu Leu Leu Ser Gly Trp Ala Phe
1               5                   10                  15

Cys Ser Gln Asp Ala Ser Asp Gly Leu Gln Arg Leu His Met Leu Gln
                20                  25                  30

Ile Ser Tyr Phe Arg Asp Pro Tyr His Val Trp Tyr Gln Gly Asn Ala
            35                  40                  45

Ser Leu Gly Gly His Leu Thr His Val Leu Glu Gly Pro Asp Thr Asn
    50                  55                  60

Thr Thr Ile Ile Gln Leu Gln Pro Leu Gln Glu Pro Glu Ser Trp Ala
65                  70                  75                  80

Arg Thr Gln Ser Gly Leu Gln Ser Tyr Leu Leu Gln Phe His Gly Leu
                85                  90                  95

Val Arg Leu Val His Gln Glu Arg Thr Leu Ala Phe Pro Leu Thr Ile
                100                 105                 110

Arg Cys Phe Leu Gly Cys Glu Leu Pro Pro Glu Gly Ser Arg Ala His
            115                 120                 125

Val Phe Phe Glu Val Ala Val Asn Gly Ser Ser Phe Val Ser Phe Arg
    130                 135                 140

Pro Glu Arg Ala Leu Trp Gln Ala Asp Thr Gln Val Thr Ser Gly Val
145                 150                 155                 160

Val Thr Phe Thr Leu Gln Gln Leu Asn Ala Tyr Asn Arg Thr Arg Tyr
                165                 170                 175
```

```
Glu Leu Arg Glu Phe Leu Glu Asp Thr Cys Val Gln Tyr Val Gln Lys
            180                 185                 190

His Ile Ser Ala Glu Asn Thr Lys Gly Ser Gln Thr Ser Arg Ser Tyr
        195                 200                 205

Thr Ser Leu Val Leu Gly Val Leu Val Gly Ser Phe Ile Ile Ala Gly
    210                 215                 220

Val Ala Val Gly Ile Phe Leu Cys Thr Gly Gly Arg Arg Cys
225                 230                 235

<210> SEQ ID NO 2
<211> LENGTH: 717
<212> TYPE: DNA
<213> ORGANISM: Homo sapiens

<400> SEQUENCE: 2
atgttgacaa cattgctgcc gatactgctg ctgtctggct gggccttttg tagccaagac      60
gcctcagatg gcctccaaag acttcatatg ctccagatct cctacttccg cgacccctat     120
cacgtgtggt accagggcaa cgcgtcgctg ggggacacc taacgcacgt gctggaaggc     180
ccagacacca acaccacgat cattcagctg cagcccttgc aggagcccga gagctgggcg     240
cgcacgcaga gtggcctgca gtcctacctg ctccagttcc acggcctcgt gcgcctggtg     300
caccaggagc ggaccttggc ctttcctctg accatccgct gcttcctggg ctgtgagctg     360
cctcccgagg gctctagagc ccatgtcttc ttcgaagtgg ctgtgaatgg gagctccttt     420
gtgagtttcc ggccggagag agccttgtgg caggcagaca cccaggtcac ctccggagtg     480
gtcaccttca ccctgcagca gctcaatgcc tacaaccgca ctcggtatga actgcgggaa     540
ttcctggagg acacctgtgt gcagtatgtg cagaaacata tttccgcgga aaacacgaaa     600
gggagccaaa caagccgctc ctacacttcg ctggtcctgg gcgtcctggt gggcagtttc     660
atcattgctg gtgtggctgt aggcatcttc ctgtgcacag gtggacggcg atgttaa       717
```

INFLAMMATORY BOWEL DISEASE DIAGNOSIS METHOD, DIAGNOSIS PROBE AND DIAGNOSIS KIT

TECHNICAL FIELD

The present disclosure relates to a diagnostic method, a diagnostic probe, and a diagnostic kit for inflammatory bowel diseases.

BACKGROUND ART

Inflammatory bowel disease (IBD) such as ulcerative colitis and Crohn's disease is a medical condition causing inflammation in the intestine. Although IBD has been a common disease in Western countries, the disease has also been on the rise in Japan. The number of Japanese patients with ulcerative colitis is 170,000, and the number of new cases of ulcerative colitis exceeds 10,000 per year, with the incidence of ulcerative colitis in Japan increasing at a rate comparable to that in Western countries. The number of Crohn's disease patients is more than 40,000, which is not as many as those with ulcerative colitis, but is increasing more than ever before. Ulcerative colitis and Crohn's disease are both chronic inflammation in the intestinal tract that develops in a relatively young age group and are refractory diseases accompanied by repeated relapse and remission.

Ulcerative colitis is diffuse, non-specific inflammation occurring in the large intestine that primarily affects mucosa and causes erosion and ulcers. The immunological mechanism is known to shape the pathological condition. Serum markers for ulcerative is in the clinical setting are non-specific inflammatory evidence. Research also reports that autoantibodies such as antineutrophil cytoplasmic antibodies and anti-smooth muscle cell antibodies are found in ulcerative colitis (NPL 1), and the antigens corresponding to these antibodies have been actively identified. However, the positive rate of each antibody is as low as 50% or less.

CITATION LIST

Non-Patent Literature

NPL 1: Zhou G et al., Digestive Diseases 2016; 34(1-2): 90-7

SUMMARY OF INVENTION

Technical Problem

There is demand for markers that can specifically detect or diagnose inflammatory bowel disease, and a method for detecting inflammatory bowel disease using these markers.

An object of the present disclosure is to provide a determination method, a diagnostic probe, and a diagnostic kit that can specifically determine inflammatory bowel disease.

Solution to Problem

The present disclosure includes subject matter described in the following items.

Item 1. A method for determining inflammatory bowel disease, comprising measuring an anti-endothelial cell protein C receptor antibody (anti-EPCR antibody) in a sample collected from a subject.

Item 2. The method according to item 1, comprising
contacting the sample collected from the subject with an endothelial cell protein C receptor (EPCR),
measuring the amount of the anti-endothelial cell protein C receptor antibody (anti-EPCR antibody) in the sample, and
determining that the subject has inflammatory bowel disease when the measured value is higher than a reference value.

Item 3. The method according to item 1 or 2, wherein the determining comprises determining:
whether inflammatory bowel disease is present,
a risk of developing inflammatory bowel disease,
severity of inflammatory bowel disease,
a preventive effect on inflammatory bowel disease,
a therapeutic effect on a patient with inflammatory bowel disease,
whether inflammatory bowel diseases has recurred,
a risk of recurrence of inflammatory bowel disease,
whether inflammatory bowel disease has relapsed, or
a risk of relapse of inflammatory bowel disease.

Item 4. The method according to any one of items 1 to 3, wherein the sample is blood, serum, or plasma.

Items 5. The method according to any one of items 1 to 4, wherein the inflammatory bowel disease is ulcerative colitis or Crohn's disease.

Item 6. A diagnostic probe for inflammatory bowel disease comprising an endothelial cell protein C receptor (EPCR).

item 7. A diagnostic kit for inflammatory bowel disease comprising an endothelial cell protein C receptor (EPCR).

Advantageous Effects of Invention

The present disclosure enables inflammatory bowel disease to be specifically diagnosed.

BRIEF DESCRIPTION OF DRAWINGS

FIG. 1 shows the frequency and titer of the anti-EPCR antibody. Control: control; UC: ulcerative colitis.

DESCRIPTION OF EMBODIMENTS

1. Subject

The subject includes not only patients with inflammatory bowel disease but also patients suspected of having inflammatory bowel disease. The "subject suspected of having inflammatory bowel disease" can be a subject who subjectively suspects themselves of having inflammatory bowel disease (not being limited to those with subjective symptoms, but also including those who simply wish to receive a preventive checkup), or a subject with objective evidence (e.g., a person who has been determined to have a reasonable possibility of having inflammatory bowel disease by a medical doctor as a result of known clinical examination (e.g., heart rate, blood pressure, and a blood or urine test) and/or medical consultation).

Inflammatory bowel disease is any disease that causes inflammation in the intestine, preferably ulcerative colitis or Crohn's disease, and more preferably ulcerative 2. Sample The sample collected from a subject can be any sample, and is, for example, body fluid such as blood (whole blood), serum, plasma, and lymph. From the standpoint of detection accuracy, blood, serum, and plasma are preferable.

3. Antigen EPCR

Disease-specific antigens for the autoantibodies in inflammatory bowel disease were not identified before the filing of this application, and the diagnosis of the disease currently relies on, for example, screening tests for inflammatory reactions. The identification of autoantibodies and their antigens is useful in (TO using them as a diagnostic probe in clinical practice, (2) diagnosing and classifying diseases, (3) elucidating pathological conditions, and (4) selecting targets for intervention.

It has been difficult to identify a membrane protein autoantigen using a known method for protein identification such as Western blotting, two-dimensional electrophoresis, mass spectrometry, or expression libraries. However, the inventors previously constructed a membrane protein autoantigen identification system (serological identification system for autoantigens using a retroviral vector and flow cytometry, "SARF," Shirai T et al., Ciin Dev immunol. 2013; 2013: 453058. doi: 10.1155/2013/453058).

In this research, the inventors attempted to identify antigens for vascular endothelial cell autoantibodies by using SARF and identified the endothelial cell protein C receptor (EPCR) and scavenger receptor class. B member I (SCARBI) as two new membrane protein autoantigens of vasculitis syndrome. Then, the inventors measured the amount of the anti-EPCR antibody and the amount of the anti-SCARBI antibody in the serum of subjects with ulcerative colitis and healthy subjects using EPCR and SCARBI as a detection or diagnostic probe, and surprisingly found That the subjects with ulcerative colitis exhibited significantly increased anti-EPCR antibody activity compared with the healthy subjects.

The endothelial cell protein. C receptor (EPCR) is a specific receptor for protein C, which is one of the blood coagulation factors, and is a transmembrane protein. Human-derived EPCR has the amino acid sequence represented by SEQ ID NO: 1 (NP #006395.2), and the EPCR according to the present disclosure can be a protein having the amino acid sequence represented by SEQ ID NO: 1 or a protein having an amino acid sequence substantially the same as the amino acid sequence represented by SEQ ID NO: 1. An "amino acid sequence substantially the same as the amino acid sequence represented by SEQ ID NO: 1" refers to an amino acid sequence having at least about 90% identity, preferably at least about 95% identity, and more preferably at least about 98% identity with the amino acid sequence represented by SEQ ID NO: 1. Preferably, the EPCR according to the present disclosure is a protein having the amino acid sequence represented by SEQ ID NO: 1.

The EPCR according to the present disclosure can also be a protein having an amino acid sequence formed by deleting, adding, or substituting, for example, one, or two or more (preferably 1 to 10, more preferably 1 to 5, still more preferably 1, 2, or 3) amino acids in the amino acid sequence represented by SEQ ID NO: 1. The position of deletion, addition, or substitution in such an amino acid sequence including a deletion, addition, or substitution is not particularly limited as ions as the activity of the protein is maintained. However, the position of deletion, addition, or substitution is preferably not in the amino acid sequence corresponding to the epitope.

The "identity" of a sequence refers to the percentage of the identical bases in all of the overlapping bases of an optimal alignment of two base sequences aligned using a mathematical algorithm known in the art (preferably, an algorithm capable of considering the introduction of gaps into one or both of the sequences for optimal alignment).

Examples of other algorithms for determining the identity of base sequences include, but are not limited to, an algorithm according to Karin. S et al., Prof. Natl. Ada. Sci. USA 90:5873-5877(1993), an algorithm according to Needlewoman S B et al., J. Mol. Biol., 48-444-453(1970), an algorithm according to Myers E W et al., CABIOS, 4:11-17(1988), and an algorithm according to Pearson. W R et al., Prof. Natl. Ada. Sci, USA, 85: 2444-2448(1988).

The EPCR can be prepared, for example, from the cells or tissue of a subject by a known method or an equivalent method. The EPCR can also be chemically synthesized by a known peptide synthesis method, for example, by using a peptide synthesizer. The EPCR can also be produced by culturing a transforming containing DNA encoding the EPCR and expressing the protein. The EPCR can also be produced by biochemical synthesis using a cell-free transcription-translation system that uses a nucleic acid encoding EPCR as a template. The EPCR may be modified in various ways, such as glycosylation.

4. Anti-EPCR Antibody

The anti-EPCR antibody can be identified by using all or part of the amino acid sequence represented by SEQ ID NO: 1 (preferably consecutive 4 or more, more preferably 5 or more, still more preferably 6 or more, and preferably consecutive 20 or less, more preferably 18 or less, and still more preferably 15 or less amino acids in the amino acid sequence represented by SEQ ID NO: 1) as an antigen.

The anti-EPCR antibody can be either a polygonal antibody or a monoclonal antibody, and can encompass not only the complete antibody molecule but also fragments thereof, such as Fab, F(ab')2, SC, and minibody.

5. Method for Measuring the Amount of Anti-EPCR Antibody

In the present disclosure, immunoassays using the EPCR protein as an antigen include Western blotting using the antigen; immunoassays such as enzyme-linked immunosorbent assay (ELISA), enzyme immunoassays, and fluorescent immunoassay; immunoprecipitation; immunonephelometry; flow cytometry; and fluorescent staining. The measurement can be performed by detecting a band, a spot, or a peak that matches the molecular weight of the antigen; however, the measurement method is not limited to these assays.

In Western blotting, proteins can be separated based on the molecular weight and isoelectric point of the antigen. Thus, whether antibodies are present can be easily determined from the position of the band size. In immunoassays, the antibody according to the present disclosure can be quantified by immobilizing cultured cells containing an antigen on a solid support (e.g., glass slide) using an appropriate solvent, and contacting a sample from a subject with the cells to measure the amount of a labeled anti-human immunoglobulin antibody. In flow cytometry, the antibody according to the present disclosure can be quantified by contacting a sample from a subject with cells overexpressing an antigen, and then reacting the sample with fluorescently labeled anti-human IgG cells. Because flow cytometry uses cells without immobilization, flow cytometry can quantify antibody activity against the extracellular domain of autoantigens and their higher-order structure.

However, the method for measuring the amount of the anti-EPCR antibody should not be limited to the above techniques; any measurement method can be used as long as the method detects the amount of an antigen, the amount of an antibody corresponding to the amount of the antigen, or the amount of an antibody-antigen complex in the sample by a chemical or physical technique and calculates the amount of the anti-EPCR antibody from the detected amount. The antigen or antibody can be bound to a labeling agent such as radioisotopes, enzymes, fluorescent substances, or luminescent substances in measurement. Examples of radioisotopes include [$^{125}$I], [$^{131}$I], [$^{3}$H], and [$^{14}$C]. Examples of the enzymes include alkaline phosphatase, peroxidase, and malate dehydrogenase. Examples of fluorescent substances include fluorescamine and fluorescein isothiocyanate. Examples of luminescent substances include luminol, luminol derivatives, luciferin, and lucigenin. Additionally, a biotin-(street)avidin system can be used in binding an antibody to a labeling agent.

To measure the amount of the antibody, a secondary antibody for the antibody specifically bound to an antigen on a transfer membrane or solid phase may be used to enhance the reaction, and the secondary antibody is preferably labeled. Secondary antibodies include, but are not limited to, natural antibodies such as polygonal antibodies and monoclonal antibodies (mAb), chimeric antibodies that can be produced using genetic recombination technology, humanized antibodies, single chain antibodies, and their binding fragments, as long as they recognize human immunoglobulins. Such secondary antibodies are well known in the art.

6. Method for Determining Inflammatory Bowel Disease

The present disclosure includes a method for determining inflammatory bowel disease that includes measuring the anti-endothelial cell protein C receptor antibody (anti-EPCR antibody) in a sample collected from a subject.

Because a high percentage of patients with inflammatory bowel disease are positive for the anti-EPCR antibody, inflammatory bowel disease can be specifically determined or diagnosed in vitro by measuring the amount of the anti-EPCR antibody in a sample collected from a subject.

The determination includes determining whether inflammatory bowel disease is present, determining a risk of developing inflammatory bowed disease, determining the severity of inflammatory bowel disease, determining the preventive effect on inflammatory bowel disease, determining the therapeutic effect on a patient with inflammatory bowel disease, determining whether inflammatory bowel disease has recurred, determining the risk of recurrence of inflammatory bowel disease, determining whether inflammatory bowel disease has relapsed, and determining the risk of relapse of inflammatory bowel disease.

A comparison of the measurement value of the anti-EPCR antibody with another value is performed based on whether there is a statistically significant difference.

In an embodiment, the method for determining inflammatory bowel disease according to the present invention includes contacting a sample collected from a subject with an endothelial cell protein C receptor (EPCR), measuring the amount of an anti-endothelial cell protein C receptor antibody (anti EPCR antibody) in the sample, and determining that the subject has inflammatory bowel disease when the measured value is higher than a reference value.

The reference value is preferably a known amount of the anti-EPCR antibody (e.g., the average calculated from the amounts of the anti-EPCR antibody in multiple patients with inflammatory bowel disease or a value greater than the average).

If the amount of the anti-EPCR antibody in a sample collected from, a subject is higher than the reference value, the subject can be determined to have inflammatory bowel disease. If the amount of the anti-EPCR antibody in a sample collected from a subject is equal to or lower than the reference value, the subject can be determined to not have inflammatory bowel disease. Such a determination can be used to determine whether a subject has inflammatory bowel disease.

In another embodiment, the method for determining inflammatory bowel disease according to the present invention includes contacting a sample collected from a subject with an endothelial cell protein C receptor (EPCR), measuring the amount of an anti-endothelial cell protein C receptor antibody (anti-EPCR antibody) in the sample, and determining that the subject is at high risk of developing inflammatory bowel disease when the measured value is higher than a reference value.

The reference value is, for example, the average calculated from the amounts of the anti-EPCR antibody of a group of healthy subjects, or a predetermined value higher than the average calculated from the amounts of the anti-EPCR antibody of a group of healthy subjects and lower than the average calculated from the amounts of the anti-EPCR antibody of a group of patients with inflammatory bowel disease.

If the amount of the anti-EPCR antibody in a sample collected from a subject is higher than the reference value, the subject can be determined to be at high risk of developing inflammatory bowel disease. If the amount of the anti-EPCR antibody in a sample collected from a subject is equal to or lower than the reference value, the subject can be determined to be at low risk of having inflammatory bowel disease. Such determination can be used to determine the risk of developing inflammatory bowel disease.

In another embodiment, the method for determining inflammatory bowel disease according to the present invention includes contacting a sample collected from, a subject with an endothelial cell protein C receptor (EPCR), measuring the amount of an anti-endothelial cell protein C receptor antibody (anti-EPCR antibody) in the sample, and determining the severity of inflammatory bowel disease of the subject by comparing the measured value with a reference value.

The reference value is, for example, the average calculated from the amounts of the anti-EPCR antibody of multiple patients with inflammatory bowel disease of a certain severity.

If the measurement value of the subject is higher than the average, the subject's inflammatory bowel disease can be determined to be highly likely to fall under the classification of the severity in question. If the measurement value of the subject is equal to or lower than the average, the subject's inflammatory bowel disease can be determined to be unlikely to fall under the classification of the severity in question. Such determination can be used to determine the severity of inflammatory bowel disease.

In another embodiment, the method for determining inflammatory bowel disease according to the present invention includes contacting a sample collected from a subject before the subject receives a measure to prevent inflammatory bowel disease and a sample collected from the subject after the subject has received the measure to prevent inflammatory bowel disease individually with an endothelial cell protein C receptor (EPCR), measuring the amount of an anti-endothelial cell protein C receptor antibody (anti-EPCR antibody) in the two samples, and determining the preventive effect on inflammatory bowel disease in the subject by comparing the measurement values of the two samples.

If the amount of the anti-EPCR antibody in the sample collected from the subject after the subject has received a measure to prevent inflammatory bowel disease is lower than the amount of the anti-EPCR antibody in the sample collected from the subject before the subject receives a measure to prevent inflammatory bowel disease, the subject can be determined to have received a preventive effect on inflammatory bowel disease. If the amount of the anti-EPCR antibody in the sample collected from the subject after the subject has received a measure to prevent inflammatory bowel disease is equal to or higher than the amount of the anti-EPCR antibody in the sample collected from the subject before the subject receives a measure to prevent inflammatory bowel disease, the subject can be determined to have received no preventive effect for inflammatory bowel disease. Measures to prevent inflammatory bowel disease include administration of anti-inflammatory drugs, such as 5-aminosalicylic acid preparations and steroid preparations, immunosuppressive drugs, medicinal agents, such as anti-TNF-α-antibodies, exercise therapy, and dietary therapy. Such determination can be used to determine the preventive effect on inflammatory bowel disease.

In another embodiment, the method for determining inflammatory bowel disease according to the present invention includes contacting a sample collected from a subject before the subject receives a measure to treat inflammatory bowel disease and a sample collected from the subject after the subject has received a measure to treat inflammatory bowel disease individually with an endothelial cell protein C receptor (EPCR), measuring the amount of an anti-endothelial cell protein C receptor antibody (anti-EPCR antibody) in the two samples, and determining the therapeutic effect on inflammatory bowel disease in the subject by comparing the two samples.

If the amount of the anti-EPCR antibody in the sample collected from the subject after the subject has received a measure to treat inflammatory bowel disease is lower than the amount of the anti-EPCR antibody in the sample collected from the subject before the subject receives a measure to treat inflammatory bowel disease, the subject can be determined to have received a therapeutic effect on inflammatory bowel disease. If the amount of the anti-EPCR antibody in the sample collected from the subject after the subject has received a measure to treat inflammatory bowel disease is equal to or higher than the amount of the anti-EPCR antibody in the sample collected from the subject before the subject receives a measure to treat inflammatory bowel disease, the subject can be determined to have received no therapeutic effect on inflammatory bowel disease. Measures to treat inflammatory bowel disease include surgery, such as blood vessel bypass surgery, administration of anti-inflammatory drugs, such as 5-aminosalicylic acid preparations and steroid preparations, immunosuppressive drugs, and medicinal agents, such as anti-TNF-α antibodies, exercise therapy, and dietary therapy. Such determination can be used to determine the therapeutic effect on inflammatory bowel disease.

In another embodiment, the method for determining inflammatory bowel disease according to the present invention includes contacting a sample collected from a subject who has been completely cured from inflammatory bowel disease with an endothelial cell protein C receptor (EPCR), measuring the amount of an anti-endothelial cell protein C receptor antibody (anti-EPCR antibody) in the sample, and determining that the subject has recurrent inflammatory bowel disease when the measurement value is higher than a reference value.

The reference value is preferably a known amount of the anti-EPCR antibody, such as the average calculated from the amounts of the anti-EPCR antibody of multiple patients with inflammatory bowel disease or a value higher than the average.

If the amount of the anti-EPCR antibody in the sample collected from the subject who has been completely cured from inflammatory bowel disease is higher than a reference value, the subject can be determined to have recurrent inflammatory bowel disease. If the amount of the anti-EPCR antibody in the sample collected from the subject who has been completely cured from inflammatory bowel disease is equal to or lower than the reference value, the subject can be determined to have no recurrent inflammatory bowel disease. Measures to treat inflammatory bowel disease include surgery, such as blood vessel bypass surgery, administration of anti-inflammatory drugs, such as 5-aminosalicylic acid preparations and steroid preparations, inmunosuppressive drugs, and medicinal agents, such as anti-TMF-α antibodies, exercise therapy, and dietary therapy. Such determination can be used to determine whether inflammatory bowel disease has recurred.

In another embodiment, the method for determining inflammatory bowel disease according to the present invention includes contacting a sample collected from a subject who has been completely cured from inflammatory bowel disease with an endothelial cell protein C receptor (EPCR), measuring the amount of an anti-endothelial cell protein C receptor antibody (anti EPCR antibody) in the sample and determining the risk of recurrence of inflammatory bowel disease in the subject by comparing the measurement value of the sample with a reference value.

The reference value is a known amount of the anti-EPCR antibody, such as the average calculated from the amounts of the anti-EPCR antibody of multiple patients with inflammatory bowel disease or a value higher than the average, a value calculated from the amount of the anti-EPCR antibody at the time of complete cure of the subject who has been completely cured from inflammatory bowel disease or a value higher than this value, or the average calculated from the amounts of the anti-EPCR antibody at the time of complete cure of multiple patients who have been completely cured from inflammatory bowel disease or a value higher than this average.

If the amount of the anti-EPCR antibody in the sample collected from a subject who has been completely cured from inflammatory bowel disease is higher than the reference value, the subject can be determined to be at high risk of having recurrent inflammatory bowel disease. If the amount of the anti-EPCR antibody in the sample collected from the subject who has been completely cured from inflammatory bowel disease is equal to or lower than the reference value, the subject can be determined to be at low risk of having recurrent inflammatory bowel disease. Measures to treat inflammatory bowel disease include surgery, such as blood vessel bypass surgery, administration of anti-inflammatory drugs, such as 5-aminosalicylic acid preparations and steroid preparations, immunosuppressive drugs, and medicinal agents, such as anti-TNF-α-antibodies, exercise therapy, and dietary therapy. Such determination can be used to determine the risk of recurrence of inflammatory bowel disease.

In another embodiment, the method for determining inflammatory bowel disease according to the present invention includes contacting a sample collected from a subject who has discontinued receiving a measure to treat inflammatory bowel disease with an endothelial cell protein C receptor (EPCR), measuring the amount of an anti-endothelial cell protein C receptor antibody (anti-EPCR antibody) in the sample, and determining whether the subject has relapsed inflammatory bowel disease by comparing the measurement value of the sample with a reference value.

The reference value is, for example, a predetermined value higher than the average calculated from the amounts of the anti-EPCR antibody of a group of healthy subjects, or the average calculated from the amounts of the anti-EPCR antibody of a group of patients with inflammatory bowel disease.

If the amount of the anti-EPCR antibody in a sample collected from a subject who has discontinued receiving a measure to treat inflammatory bowel disease is higher than the reference value, the subject can be determined to have relapsed inflammatory bowel disease if the amount of the anti-EPCR antibody in the sample collected from the subject who has discontinued receiving a measure to treat inflammatory bowel disease is equal to or higher than the reference value, the subject can be determined to have no relapsed inflammatory bowel disease. Measures to treat inflammatory bowel disease include surgery, such as blood vessel bypass surgery, administration of anti-inflammatory drugs, such as 5-aminosalicylic acid preparations and steroid preparations, immunosuppressive drugs, and medicinal agents, such as anti-TNF-α antibodies, exercise therapy, and dietary therapy. Such determination can be used to determine whether inflammatory bowel disease has relapsed.

In another embodiment, the method for determining inflammatory bowel disease according to the present invention includes contacting a sample collected from a subject who is undergoing a measure to treat inflammatory bowel disease and a sample collected from the subject after the subject has discontinued the measure to treat inflammatory bowel disease individually with an endothelial cell protein C receptor (EPCR), measuring the amount of an anti-endothelial cell protein C receptor antibody (anti-EPCR antibody) in the two samples, and determining the risk of relapse of inflammatory bowel disease in the subject by comparing the measurement values of the two samples.

If the amount of the anti-EPCR antibody in the sample collected from the subject after the subject has discontinued the measure to treat inflammatory bowel disease is higher than a reference value, the subject can be determined to be at high risk of having relapsed inflammatory bowel disease. If the amount of the anti-EPCR antibody in the sample collected from the subject after the subject has discontinued the measure to treat inflammatory bowel disease is equal to or lower than the reference value, the subject can be determined to be at low risk of having relapsed inflammatory bowel disease. Measures to treat inflammatory bowel disease include surgery, such as blood vessel bypass surgery, administration of anti-inflammatory drugs, such as 5-aminosalicylic acid preparations and steroid preparations, inmunosuppressive drugs, and medicinal agents, such as anti-TMF-α antibodies, exercise therapy, and dietary therapy. Such determination can be used to determine the risk of relapse of inflammatory bowel disease.

7. Diagnostic Probe

The present disclosure also includes a diagnostic probe for inflammatory bowel disease containing an endothelial cell protein C receptor (EPCR).

Inflammatory bowel disease can be any disease that causes inflammation in the intestine, preferably ulcerative colitis or Crohn's disease, and more preferably ulcerative colitis.

The EPCR can be a protein having the amino acid sequence represented by SEQ ID NO: 1 or a protein having an amino acid sequence substantially the same as the amino acid sequence represented by SEQ ID NO: 1. An "amino acid sequence substantially the same as the amino acid sequence represented by SEQ ID NO: 1" refers to an amino acid sequence having at least about 90% identity, preferably at least about 95% identity, and more preferably at least about 98% identity with the amino acid sequence represented by SEQ ID NO: 1. Preferably, the EPCR according to the present disclosure is a protein having the amino acid sequence represented by SEQ ID NO: 1.

The EPCR can also be a protein having an amino acid sequence formed by deleting, adding, or substituting, for example, one, or two or more (preferably 1 to 10, more preferably 1 to 5, still more preferably 1, 2, or 3) amino acids in the amino acid sequence represented by SEQ ID NO: 1. The position of deletion, addition, or substitution in such an amino acid sequence including a deletion, addition, or substitution is not particularly limited as long as the activity of the protein is maintained. However, the position of deletion, addition, or substitution is preferably not in the amino acid sequence corresponding to the epitope.

8. Diagnostic Kit

The present disclosure also includes a diagnostic kit for inflammatory bowel disease containing an endothelial cell protein C receptor (EPCR).

Inflammatory bowel disease can be any disease that causes inflammation in the intestine, preferably ulcerative colitis or Crohn's disease, and more preferably ulcerative colitis.

The EPCR can be a protein having the amino acid sequence represented by SEQ ID NO: 1 or a protein having an amino acid sequence substantially the same as the amino acid sequence represented by SEQ ID NO: 1. An "amino acid sequence substantially the same as the amino acid sequence represented by SEQ ID NO: 1" refers to an amine acid sequence having at least about 90% identity, preferably at least about 95% identity, and more preferably at least about 98% identity with the amino acid sequence represented by SEQ ID NO: 1. Preferably, the EPCR according to the present disclosure is a protein having the amino acid sequence represented by SEQ ID NO: 1.

The EPCR can also be a protein having an amino acid sequence formed by deleting, adding, or substituting, for example, one, or two or more (preferably 1 to 10, more preferably 1 to 5, still more preferably 1, 2, or 3) amino acids in the amino acid sequence represented by SEQ ID NO: 1. The position of deletion, addition, or substitution in such an amino acid sequence including a deletion, addition, or substitution is not particularly limited as long as the activity of the protein is maintained. However, the position of deletion, addition, or substitution is preferably not in the amino acid sequence corresponding to the epitope.

The diagnostic kit may contain, in addition to the EPCR, other substances that are necessary in the reaction for detecting the amount of the antibody, and that do not adversely affect the reaction when stored together with the EPCR, such as a variety of reagents (e.g., chromogenic reagents, labeled secondary antibodies, and blocking agents). The diagnostic kit may further contain a buffer solution, a washing solution, and instructions for use.

The EPCR (antigen protein) provided is preferably immobilized on a suitable solid support. Examples of solid supports include various supports composed of an insoluble polysaccharide (e.g., agarose, dextran, and cellulose), synthetic resin, glass, or metal used in typical antigen-antibody reactions, such as microplates, tubes, membranes, columns, beads, and sensor chips. Immobilization can be done by physical adsorption or by chemical bonding, which is typically used in insolubilizing or immobilizing proteins.

The diagnostic kit according to the present disclosure can be applied, for example, in the diagnosis of inflammatory bowel disease or in a clinical test for inflammatory bowel disease (e.g., monitoring), or in drug discovery research targeting signal transduction by EPCR.

The disclosures of all patent applications and documents cited in this specification are incorporated herein by reference in their entirety.

Although embodiments of the present disclosure are described in detail above, the present disclosure is not limited to these embodiments, and various variations based on the technical idea of the present disclosure are possible.

The following Examples describe the present disclosure in more detail. However, the present disclosure is not limited to the Examples.

EXAMPLES

1. Subject

At the Tohoku University Hospital, blood samples were collected from 36 patients diagnosed with ulcerative colitis according to the diagnostic criteria for ulcerative colitis described in research on intractable inflammatory bowel disease by a policy research project for intractable diseases supported by a health and labor sciences research grant (revised on Jan. 21, 2017), and from 79 healthy subjects (controls). Blood was collected from the veins of the subjects and centrifuged according to an ordinary method to obtain serum, which was then stored in a freezer until use.

2. Flow Cytometry and Antibody-Binding Experiment

The DNA sequence of EPCR (SEQ ID NO: 2) was amplified by PCR and inserted into pMX-GFP vectors. Plat E cells were transfected with retroviral vectors containing these EPCR-GFPs using Eugene to create retroviruses containing the EPCR-GFP sequence. Rat myeloma cells were then infected with the retroviruses to establish cells that forcefully express the EPCR protein. Each cell that forcefully expresses the EPCR protein was expressing GFP. After these cells were mixed with GFP-negative cells, these cells were reacted with serum-derived IgG (primary antibody) and PE (phycoerythrin)-anti-human IgG antibody (secondary antibody). Subsequently, anti-EPCR antibody activity was measured by comparing the fluorescence intensity of PE between the GFP-positive group and the GFP-negative group by FACS.

The titer of the anti-EPCR antibody in patients with ulcerative colitis and the titer of healthy subjects were measured (FIG. 1). The vertical axis indicates the mean fluorescence intensity (MCI) ratio of serum IgG binding to EPCR-expressing cells to serum IgG binding to EPCR-non-expressing cells. Whereas the anti-EPCR antibody was detected in 25 out of 36 patients with ulcerative colitis (about 70%), no anti-EPCR antibody was detected in the healthy subjects. The amount of the anti-EPCR antibody in the patients with ulcerative colitis was significantly higher than the amount of the anti-EPCR antibody in the healthy subjects (Mann Whitney test).

Although the expression of an anti-SCARBI antibody in subjects was also examined, no significant difference was found between patients with ulcerative colitis and healthy subjects (data not shown).

Sequence Listing

The invention claimed is:

1. A method for determining a risk of recurrence of inflammatory bowel disease in a subject and treating said subject, comprising:
   contacting a sample collected from a subject with an endothelial cell protein C receptor (EPCR);
   measuring an amount of the anti-endothelial cell protein C receptor antibody (anti-EPCR antibody) in the sample collected from a subject;
   comparing the measured value with a reference value; and
   determining that the amount of the anti-EPCR antibody in the sample collected from the subject is higher than the reference value and treating the subject;
   wherein the sample is blood, serum, or plasma, and the subject is a human, and
   wherein the treatment is selected from the group consisting of surgery, exercise therapy, dietary therapy, administration of an anti-inflammatory drug, administration of an immunosuppressive drug, or administration of an anti-TNF-α-antibody.

2. The method according to claim 1, wherein the fact that the measured value being higher than the reference value indicates that determining that the subject is at high risk of having recurrent inflammatory bowel disease.

3. A method for determining a therapeutic effect on inflammatory bowel disease in a subject after the subject has received a measure to treat inflammatory bowel disease and treating said subject, comprising:
   contacting a sample collected from a subject before the subject receives a measure to treat inflammatory bowel disease and a sample collected from the subject after the subject has received a measure to treat inflammatory bowel disease individually with an endothelial cell protein C receptor (EPCR);
   measuring the amount of an anti-endothelial cell protein C receptor antibody (anti-EPCR antibody) in the two samples, and determining the therapeutic effect on inflammatory bowel disease in the subject by comparing the two samples; and
   determining that the amount of the anti-EPCR antibody in the sample collected from the subject after the subject has received a measure to treat is equal to or higher than the amount before the subject has received a measure to treat, and treating the subject;
   wherein the sample is blood, serum, or plasma, and the subject is a human, and
   wherein the treatment is selected from the group consisting of surgery, exercise therapy, dietary therapy, administration of an anti-inflammatory drug, administration of an immunosuppressive drug, or administration of an anti-TNF-α-antibody.

4. The method according to claim 3, wherein the fact that the amount of the anti-EPCR antibody in the sample collected from the subject after the subject has received a measure to treat inflammatory bowel disease is equal to or higher than the amount of the anti-EPCR antibody in the sample collected from the subject before the subject receives a measure to treat inflammatory bowel disease indicates that the subject has received no therapeutic effect on inflammatory bowel disease.

5. The method according to claim 3, wherein the measure to treat inflammatory bowel disease is selected from the group consisting of surgery, exercise therapy, dietary therapy, administration of an anti-inflammatory drug, administration of an immunosuppressive drug, or administration of an anti-TNF-α-antibody.

6. A method for detecting an amount of an anti-endothelial cell protein C receptor antibody (anti-EPCR antibody) in a subject, comprising:
   contacting a sample collected from a subject with an endothelial cell protein C receptor (EPCR); and
   measuring an amount of the anti-endothelial cell protein C receptor antibody (anti-EPCR antibody) in the sample collected from the subject;
   wherein the sample is blood, serum, or plasma, and
   wherein the subject is a human patient with objective evidence of inflammatory bowel disease or a human patient with inflammatory bowel disease.

7. The method of claim 6, wherein the human patient with objective evidence of inflammatory bowel disease is a person who has been determined to have a reasonable possibility of having inflammatory bowel disease by a medical doctor.

* * * * *